United States Patent [19]

Weiss et al.

[11] Patent Number: 4,993,532
[45] Date of Patent: Feb. 19, 1991

[54] AUTOMATIC READJUSTING ASSEMBLY FOR AN ELECTROMAGNETIC CLUTCH OR BRAKE APPARATUS

[75] Inventors: Harald Weiss, Kaufbeuren; Winfried Höfler, Krumbach; Karl Schilling, Auerberg; Günter Klinger, Oberostendorf, all of Fed. Rep. of Germany

[73] Assignee: Chr. Mayr. GmbH & Co. KG, Mauerstetten, Fed. Rep. of Germany

[21] Appl. No.: 450,839

[22] Filed: Dec. 14, 1989

[30] Foreign Application Priority Data

Dec. 14, 1988 [EP] European Pat. Off. ............ 88120922

[51] Int. Cl.$^5$ ...................... F16D 13/75; F16D 27/14; F16D 65/54
[52] U.S. Cl. ............................... 192/111 A; 192/84 B; 188/71.8; 188/196 P
[58] Field of Search ............... 192/111 A, 84 B, 84 C, 192/70.25; 188/71.8, 164, 196 P

[56] References Cited

U.S. PATENT DOCUMENTS

| | | | |
|---|---|---|---|
| 2,705,058 | 3/1955 | Harter | 188/164 |
| 3,221,854 | 12/1965 | Jaeschke et al. | 188/196 P X |
| 3,391,768 | 6/1968 | Fixari | 192/111 A |
| 3,394,787 | 7/1968 | Fitzgerald | 192/111 A X |
| 3,458,022 | 7/1969 | Reiff | 188/196 P X |
| 3,762,522 | 10/1973 | Kirschling | 192/111 A |
| 3,857,468 | 12/1974 | Iritoro et al. | 192/84 C |
| 4,640,400 | 2/1987 | Nakane et al. | 192/70.25 |

FOREIGN PATENT DOCUMENTS

| | | |
|---|---|---|
| 0054734 | 10/1981 | European Pat. Off. . |
| 2135821 | 2/1972 | Fed. Rep. of Germany . |
| 8624705.0 | 1/1987 | Fed. Rep. of Germany . |
| 1252875 | 12/1960 | France . |
| 2539195 | 7/1984 | France . |
| 58-166138 | 10/1983 | Japan ........................... 192/111 A |
| 58-196329 | 11/1983 | Japan ........................... 192/84 C |

*Primary Examiner*—Richard Lorence
*Attorney, Agent, or Firm*—Wenderoth, Lind & Ponack

[57] ABSTRACT

An automatic air gap readjusting assembly in a clutch or brake unit is operated by electromagnetic and spring forces. A drive shaft 3 frictionally mounts, by a plurality of O-rings, an adjustment member. The adjustment member is readjusted by a contact or armature plate such that the air gap between the armature plate and the electromagnetic mechanism attracting the armature plate will remain constant, i.e. the stroke of the armature plate will remain constant. Torque is transmitted from the drive shaft to the armature plate via a radial flange having a plurality of axially movable torque transmitting bolt assemblies, which are clamped to an annular spring member secured to the armature plate. This arrangement allows for continuous readjustment for wear of the air gap between the armature plate and the electromagnetic mechanism; furthermore, the readjustment always takes place under uniform force conditions despite increasing wear.

11 Claims, 2 Drawing Sheets

AUTOMATIC READJUSTING ASSEMBLY FOR AN ELECTROMAGNETIC CLUTCH OR BRAKE APPARATUS

BACKGROUND OF THE INVENTION (1) Field of the Invention

The present invention relates to an assembly for automatically readjusting the air gap of a clutch or brake apparatus actuated by electromagnetic and spring forces.

(2) State of the Prior Art

Various assemblies for automatically readjusting the air gap of a clutch or brake apparatus that is actuated by electromagnetic and spring forces are known. Assemblies of this type are advantageous in that a uniform air gap will produce uniform operating conditions, i.e. uniform actuation times and improved positioning accuracy of the clutch or brake members. Furthermore, the user of such a clutch or brake apparatus will then not have to readjust the air gap, since the air ga is readjusted automatically.

One known type of readjusting assembly is known form EP-A1-54 734. However, this automatic readjusting assembly has the disadvantage of torque being transferred from a shaft to an armature plate through two annular springs or lamellas operating in series. One of the annular springs transmits torque from a flange hub connected to the shaft to an entrainment ring. An axially acting entrainment connection connects the entrainment ring to the armature plate. However, the entrainment connection does not transfer torque between the entrainment ring and the armature plate. The entrainment ring is connected to the armature plate for purposes of transmitting torque with the second annular spring. This arrangement of an automatic readjusting assembly suffers from the disadvantage that the distance the first annular spring must travel will increase with wear, so that it becomes increasingly difficult for a magnetic coil of the clutch or brake apparatus to reposition the entrainment ring for automatic readjustment against a frictional engagement which may exist between the shaft and the entrainment ring. This problem can be remedied by a locking mechanism acting on the shaft and the entrainment ring, but such a remedy involves substantial manufacturing expenses.

Another assembly for readjusting the air gap of a clutch or brake apparatus is known from DE-A-2 135 821. The arrangement disclosed therein uses axially movable bolts in connection with leaf springs in order to transfer torque from a hub on a shaft of a clutch or brake unit to an axially movable armature plate. However, the readjustment in this arrangement takes place at at least three points simultaneously.

SUMMARY OF THE INVENTION

Accordingly, it is an object of the present invention to provide an automatic readjusting assembly for a clutch or brake apparatus wherein adjustment of an air gap between an armature and a friction coating of the clutch or brake apparatus does not become more difficult as the friction coating wears down. More specifically, it is an object of the present invention to provide for a readjustment in a clutch or brake apparatus wherein the magnetic coil of the clutch or brake apparatus will not have to overcome increasingly larger spring forces due to increased wear of the friction coating. It is a more general object of the present invention to provide an automatic readjusting assembly for a clutch or brake apparatus which has improved positioning accuracy over the entire life of the clutch or brake apparatus. Furthermore, it is an object of the present invention to provide an automatic readjusting assembly for a clutch or brake apparatus which is simple in both design and manufacture.

The objects of the present invention are achieved by providing an apparatus for adjusting an air gap in at least one of a clutch mechanism and a brake mechanism. The apparatus includes a rotatable shaft, a contact plate (preferably an armature plate) disposed for axial movement relative to the shaft, and a mounting arrangement for mounting the contact plate t the shaft such that the contact plate will be axially movable in the axial direction of and relative to the shaft, yet substantially rotationally fixed with respect to the shaft. Furthermore, there is a contact mechanism, preferably an electromagnetic coil disposed inside a housing, for attracting and contacting the contact plate. This contact provides the braking or clutching action. An adjustment mechanism for automatically compensating for wear between the contact mechanism and the contact plate, in order to maintain a constant air gap between the contact plate and the contact mechanism, has a biasing member, preferably a spring, for biasing the contact plate toward a position away from the contact mechanism. The adjustment mechanism further has an adjustment member in frictional engagement with the shaft of the clutch or brake assembly.

An engagement portion is fixed to the contact plate such that a space is formed between the engagement portion and the contact plate itself. The adjustment member then has an outwardly projecting flange portion projecting into the space which can engage with the engagement portion or the contact plate. A biasing mechanism, preferably a spring, is disposed on the outwardly projecting flange portion so as to contact and bias the engagement portion of the contact plate.

Preferably, the adjustment member is an annular member and surrounds the shaft. Furthermore, the outwardly projecting flange portion of the adjustment member projects substantially orthogonally from the adjustment member. The adjustment member and the shaft have therebetween an arrangement for frictionally engaging each other. That is, the adjustment member is frictionally engaged with the shaft, preferably by a number of O-rings surrounding the shaft.

As noted above, the contact mechanism is preferably composed of a coil supporting element and a magnetic coil supported therein. A frictional contact coating is also preferably provided for contact with the contact plate. The contact plate is preferably an armature plate adapted to be attracted by the magnetic coil of the contact mechanism. The armature plate is preferably concentric with the shaft.

The mechanism for mounting the contact plate to the shaft includes a radial flange connected thereto, preferably fixed to or unitary with the shaft, and a plurality of bolt assemblies connected to the contact plate. The bolt assemblies are axially slidably yet substantially rotationally rigidly mounted to the radial flange. The contact plate has a torque transmitting annular member secured thereto. Preferably, the torque transmitting annular member is a spring member. A plurality of bolt holes are provided through the annular member. Each bolt assembly comprises a bolt and a threaded bolt sleeve on the bolt. Each bolt and its respective bolt sleeve receives and holds the torque transmitting annular member therebetween through the bolt holes of the annular member. The radial flange has a plurality of axial bores therethrough corresponding to the bolt assemblies, each bore having a bearing liner insert sleeve receiving a respective bolt assembly therein.

As noted above, the annular member is preferably a spring member. Furthermore, the annular member is preferably axially yieldable but substantially rigid circumferentially in order to transmit torque between the shaft and the armature plate.

In operation, as the frictional coating contacting the armature plate wears, the armature plate is required to be moved further away from the radial flange mounting it. However, as the armature plate moves further axially, the engagement portion also moves the adjustment member via the outwardly projecting flange portion. The armature plate, when disengaged from the magnetic coil, is biased by the spring on the outwardly projecting flange portion away from the magnetic coil. The armature plate contacts the outwardly projecting flange portion as a stop member. Thus since the outwardly projecting flange portion is moved by the engagement portion, the adjustment member will move axially along with the wear of the frictional coating. Thus, upon axial movement of the armature plate away from the magnetic coil, the armature plate will always stop at the same distance away from the magnetic coil and the frictional coating. Accordingly, the air gap in the non-actuated position is always maintained constant by this automatic readjustment.

Furthermore, the torque transfer between the shaft and the armature plate is effected by the bolt assemblies. No restoring forces are generated, as in the torque transmitting annular spring of the above discussed prior art.

Furthermore, the attraction force produced by the magnetic coil is counteracted only by the spring of the outwardly projecting flange portion (an entrainment connection). This force will always remain constant, since the bias of the spring does not change as the wear of the apparatus increases.

Further advantages of the invention are that a relatively simple inventive solution results in the simple manufacture of the device. Furthermore, the readjustment of the air gap takes place on a simple frictional basis. While the basic principle has been known per se, it has not been known in such a way that the friction between the adjustment member and the shaft is generated in a simple manner, merely by placing O-rings in corresponding grooves in the shaft or by similar friction elements.

Furthermore, another advantage of the present invention resides in that the force transmitting bolt assemblies are connected with the torque transmitting annular member such that the axially movable bolt assemblies will guide the armature plate, while the annular member provides some compensation. If the bolt were connected to the armature plate directly, the armature plate might be unable to uniformly engage the magnetic coil supporting member in a parallel manner, potentially causing the armature plate to become stuck. Accordingly, the torque transmitting annular member acts as a resilient, compensating, shaft coupling. Moreover, the design of the present invention results in excellent positioning accuracy of the clutch or brake parts, with uniform and short actuation times, as well as soft engagement of the clutch or brake apparatus. This, in turn, results in less maintenance and longer service life.

BRIEF DESCRIPTION OF THE DRAWINGS

Further characteristics, features and advantages of the automatic readjusting assembly for electromagnetic clutch or brake apparatuses of the present invention will become clear from the following detailed description of a preferred embodiment thereof, with reference to the accompanying drawings, wherein.

DETAILED DESCRIPTION OF THE PREFERRED EMBODIMENTS

Figure 1:
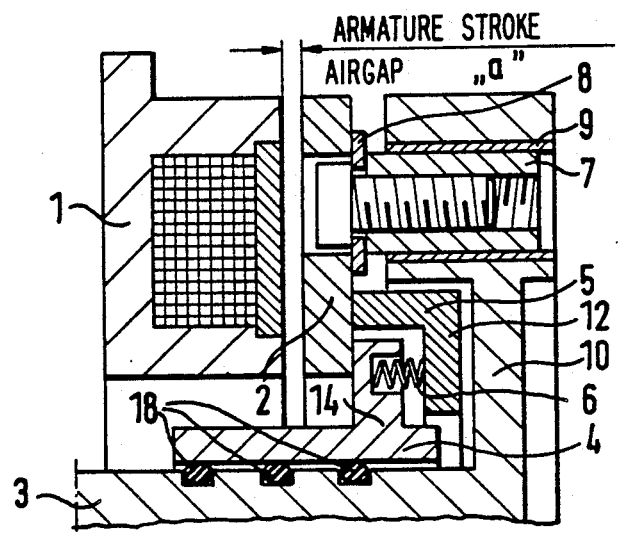
FIG. 1 is a sectional view of a brake unit in a nonenergized position having an automatic air gap readjusting assembly according to the present invention.
Figure 2A:
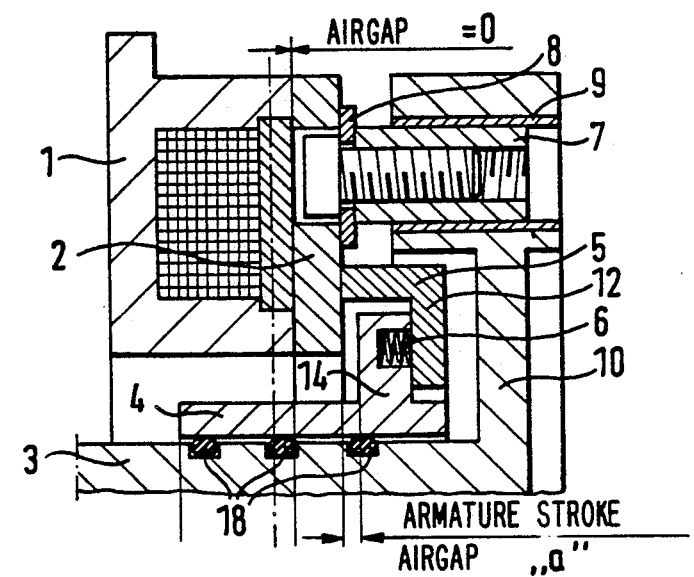
FIG. 2A illustrates the brake unit of FIG. 1 in an electromagnetically energized condition but without wear or readjustment having taken place.
Figure 2B:
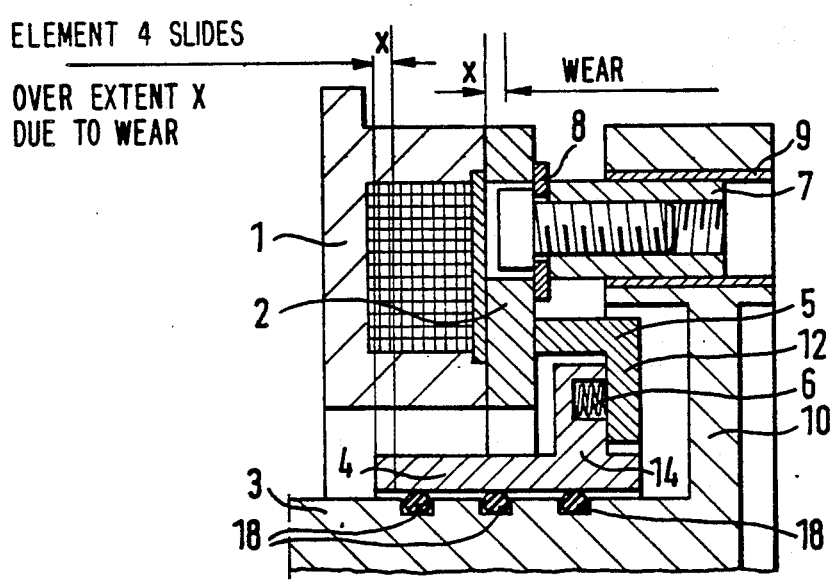
FIG. 2B illustrates the brake unit of FIG. 1 in the electromagnetically energized condition as in FIG. 2A, but after the unit has experienced wear and readjustment has taken place.
Figure 3:
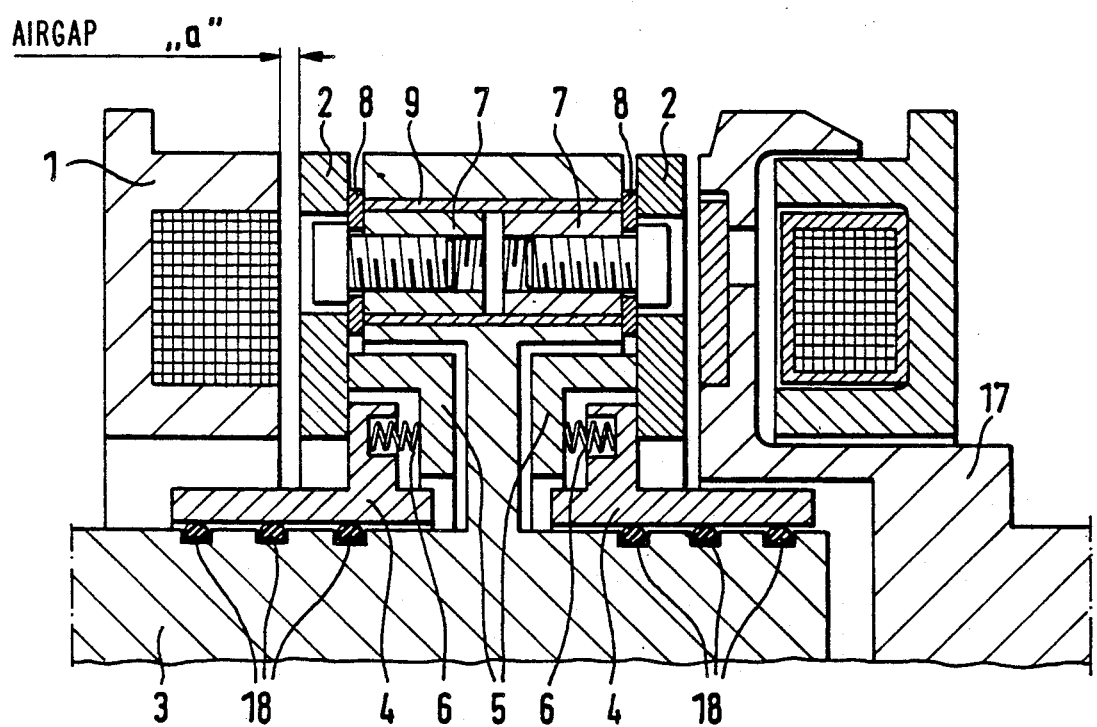
FIG. 3 a sectional view of a electromagnetic clutch and brake unit provided with the automatic readjusting assembly according to the present invention.

Initially, please note that FIGS. 1-3 each only show the upper part of a clutch or brake mechanism; the lower parts thereof would be identical to the illustrated upper parts.

FIG. 1 illustrates a brake mechanism according to the present invention. A contact mechanism 1 is designed to attract and contact a contact plate 2. Preferably, the contact mechanism 1 is electromagnetic, including an electromagnetic coil supporting element, an electromagnetic coil therein, and a frictional coating disposed thereon. Similarly, the contact plate 2 is preferably an armature plate. The contact mechanism may be secured to an engine wall or other similar structure.

Furthermore, the contact mechanism surrounds a drive shaft 3 intended t be decelerated. The drive shaft 3 has an arrangement for mounting thereon the contact or armature plate 2 such that the contact plate will be engagable by the contact mechanism 1. In accordance with the present invention, the contact plate 1 is mounted to the shaft 3 such that the contact plate will be axially movable in the axial direction of the shaft while being substantially rotationally fixed with respect to the shaft such that torque may be transmitted to the contact plate 2 from the shaft 3. The mounting arrangement preferentially includes a radially outwardly projecting circumferential flange 10. An enlarged portion of the flange 10 has a plurality of parallel axial bores uniformly spaced along its outer periphery. A plurality of bolt assemblies 7 ar also provided corresponding in number to the axial bores of the radial flange. Each of bolt assembly 7 is connected to the contact plate 2 and is slidably received in a respective axial bore of the radial flange 10. These bolt assemblies serve to transmit torque from the radial flange to the contact plate 2 while allowing the contact plate 2 to move axially relative to the radial flange 10. As an example, three bolt assemblies 7 may be provided about the periphery of the radial flange 10, although only one such assembly is seen in the drawing.

Each axial bore of the radial flange 10 is preferably provided with an inside bearing sleeve 9 for receiving a respective bolt assembly 7 therein. Furthermore, each bolt assembly is preferably made up of a threaded bolt portion and a threaded sleeve portion threaded onto the threaded bolt portion, as seen in the Figures.

An annular member 8, preferably made of a resilient spring material resilient in an axial direction but substantially rigid to circumferential forces, is clamped and held between the bolt and the bolt sleeve of each respective bolt assembly 7. For this purpose, the annular member 8 preferably has a plurality of uniformly spaced bores along its periphery for receiving the externally threaded bolts of the bolt assemblies 7 therethrough. The annular member 8 is connected to the contact plate 2, preferably by a number of rivets which are positioned about the periphery of the annular member 8, more preferably at central positions between respective bolt assemblies 7. The rivet connections are not illustrated in the drawings. From this description, it can be seen that the use of the bolt assemblies 7 together with the annular member 8 provides a connection which transmits rotational torque to the contact member 2, while allowing for some axial resiliency due to the nature of the spring material of the annular member 8. With respect to the contact plate 2, note that a number of bores are provided therethrough so as to allow space for receiving the heads of the bolts of the respective bolt assemblies 7.

A frictional entertainment connection between the contact or armature plate 2 and the shaft 3 allows for the automatic readjustment of the air gap between the contact plate 2 and the contact mechanism 1. To provide this connection, an entrainment or engagement portion 5 is secured to the contact plate 2. The engagement portion 5 is preferably a ring shaped member, having a portion 12 projecting radially inwardly towards the shaft 3. The engagement portion 5 is preferably firmly secured to the contact plate 2 by screw fasteners or the like. Due to the portion 12 extending radially inwardly, and as can be seen from the drawing Figures, a space is formed between the contact plate 2 and portion 12 of the engagement portion 5.

An adjustment member 4 is provided for frictional engagement with the shaft 3. In a preferred form of the invention, the adjustment 4 is a sleeve-like cylindrical ring member. A frictional connection is provided between adjustment member 4 and the drive shaft 3. This frictional connection may be provided by one or more resilient O-rings 18 being provided in grooves on the shaft 3 between the shaft and the adjustment member 4. The adjustment member 4 has an outwardly projecting flange portion 14 extending into the space formed between portion 12 of engagement portion 5 and the contact plate 2.

A biasing arrangement is provided so as to bias the contact plate 2 away from its contact position with the contact mechanism 1. Preferably this biasing mechanism is a compression spring 6 seated between the radially outwardly projecting flange portion 14 of the adjustment member 4 and the radially inwardly projecting portion 12 of the engagement portion 5. The compression spring 6 may be one or more compression coil springs as illustrated in the Figures, or may be a corrugated washer, a ball bearing compensation disk or a belleville washer. When the electromagnetic coil of the contact mechanism 1 is not energized, the spring 6 will urge the engagement portion 5, and thus the contact plate 2, towards the right (as illustrated in FIG. 1) such that the face of the contact or armature plate 2 opposite the contacting surface thereof will engage the surface opposite the spring 6 of the radially outwardly projecting flange portion 14 of the adjustment member 4.

The operation of the automatically readjusting brake apparatus according to the present invention will now be explained in detail FIG. 1 illustrates the brake device according to the invention in its non-engaged position. In this position, an air gap a exists between the frictional coating surface of the contact mechanism 1 and the contact or armature plate 2. In this non-energized condition, the brake is maintained in its position by the compression spring 6 acting between the adjustment member 4 and the engagement portion 5 connected to the contact plate 2. Energizing the electromagnetic coil inside the coil supporting member of the contact mechanism 1 causes the armature plate 2 to be attracted towards the frictional coating surface of the contact mechanism 1 against the force of the compression spring 6. The air gap a is thus reduced to zero, as illustrated in FIG. 2A. At this point, torque is transmitted from drive shaft 3, which is to be decelerated, through the radial flange 10 to the bolt assemblies 7 along the circumferential periphery of the flange 10, and then to the annular member 8. The contact or armature plate 2 also has the torque transmitted thereto because of the substantial rigidity of the annular member 8 to torque. Since the armature plate 2 is at this point in contact with the frictional coating surface of the contact mechanism 1, the torque is transmitted thereto and the drive shaft 3 is decelerated.

FIG. 3 illustrates a clutch and brake unit provided together. A brake portion similar to FIGS. 1 and 2 is shown on the left hand side of the Figure, while a clutch portion is shown on the right hand side of the Figure. The only difference is that on the clutch side, a rotor 17 is provided to be engaged with the shaft 3. The frictional contact surface is thus provided on the rotor 17, with the contact mechanism for attracting the contact plate 2 disposed behind the frictional contact surface of the rotor 17. Otherwise, the clutch side of the assembly of FIG. 3 is identical to the above-described brake.

Noting again FIG. 2A, energization of the electromagnetic coil of the contact mechanism 1 causes the attraction of the contact or armature plate 2 towards the contact mechanism 1. This in turn causes the compression of the spring 6 as well as the movement of the contact or armature plate 2 to a distance equal to the width of air gap a (the stroke of the armature plate 2) relative to the outwardly projecting flange portion 14 of the adjustment member 4. Thereafter, the adjustment member 4 will remain in position due to the frictional engagement with the shaft 3, for example due to compressive forces exerted by the three O-rings 18 illustrated. After the electromagnetic coil has been deenergized the armature plate 2 will return to its initial position as illustrated in FIG. 1.

But if the contact mechanism 1, or the corresponding portion of rotor 17 of the clutch and brake unit of FIG. 3, is worn down a distance x, the contact or armature plate 2 will move towards the left (on the brake side) or to the right (on the clutch side) by the distance x in addition to the air gap width a. Thus the engagement portion 5 will displace the adjustment member 4 in the appropriate direction by the magnitude x of the wear. Obviously, this is because the force of the electromagnetic coil of the contact mechanism 1 is large enough to both pull the contact or armature plate 2 towards it as well as moving the adjustment member 4 against its frictional engagement with the shaft 3. Thus as the contact mechanism 1 continues to wear, the adjustment member 4 will be adjusted appropriately in the direction of wear. The three O-rings 18, exerting a radial pressing force, will maintain the adjustment member 4 in its new position. When the contact mechanism 1 is subsequently deenergized, the compression spring 6 will again cause the contact or armature plate 2 to move towards the right, with respect to the brake, but only by a distance corresponding to the air gap a, and not by a distance corresponding to the sum of the air gap a and the wear x.

Thus the provision of the outwardly projecting flange portion 14 and the adjustment member 4 limits the movement range of the contact or armature plate 2, together with the engagement portion 5. But this range of movement can, as has been seen, be adjusted to take into account the wear of the contact mechanism 1 by having the adjustment member 4 as a whole moved with the amount of wear. Furthermore, the more the frictional coating of the contact mechanism 1 on the brake side, or the rotor on the clutch side, wears down, the more the contact or armature plate 2 and the engagement portion 5 will follow and adjust. However, the contact or armature plate 2 will never move a distance greater than the width of air gap a away from the contact mechanism 1.

Furthermore, by connecting the torque transmitting annular member 8 to the radial flange 10 on the shaft 3 with the torque transmitting bolt assemblies 7 such that the bolt assemblies are axially movable in a substantially friction free manner, the compression spring 6 will always tend to exert the same resetting force on the contact or armature plate 2. This condition is regardless of the amount of wear the assembly has undergone. Because the annular member 8 is a resilient spring material member connecting the torque transmitting bolt assemblies 7 and the contact or armature plate 2, any slight alignment errors of the contact or armature plate 2, for example resulting from non-uniform wear or other similar effects, will be compensated for so that the axially movable torque transmitting bolt assemblies and the contact or armature plate 2 will not become stuck or jammed. Furthermore, the air gap will be maintained at a uniform width so that the actuation time of the clutch or brake will remain constant and an improved positioning accuracy of the clutch or brake unit will be obtained. The automatic readjusting action makes further adjustment of the air gap unnecessary; that is, the assembly is maintenance free. Furthermore, the force provided by the compression spring 6 is uniform, and will remain so because the force is independent of the wear of the assembly. Thus the force of the electromagnetic coil of the contact mechanism 1 will remain uniform as well.

We claim:

1. An apparatus for adjusting an air gap in at least one of a clutch and a brake mechanism, comprising:
   a rotatable shaft;
   a contact plate for axial movement relative to said shaft;
   means for mounting said contact plate to said shaft such that said contact plate is axially movable in the axial direction of and relative to said shaft yet substantially rotationally rigid with respect to said shaft;
   contact means for attracting said contact plate and contacting said contact plate in a first position thereof for providing at least one of a braking and a clutching action with said shaft;
   adjustment means, having a biasing means for biasing said contact plate toward a second position away from said contact means, for automatically compensating for wear between said contact means and said contact plate in order to maintain a constant air gap between said contact plate and said contact means when said contact plate is in said second position away from said contact means, said adjustment means including an adjustment member in frictional engagement with said shaft;
   wherein said means for mounting said contact plate to said shaft comprises a radial flange connected to said shaft and a plurality of bolt assemblies connected to said contact plate and axially slidably yet substantially rotationally rigidly mounted to said radial flange.

2. The apparatus as set forth in claim 1, wherein:
   said adjustment means further comprises an engagement connected to said contact plate;
   said adjustment member has an outwardly projecting flange portion for alternate engagement with said engagement portion connected to said contact plate and said contact plate itself; and
   said biasing means is disposed on said outwardly projecting flange portion so as to contact and bias said engagement portion connected to said contact plate.

3. The apparatus as set forth in claim 2, wherein:
   said adjustment member is annular and surrounds said shaft, said outwardly projecting flange portion projecting substantially orthogonally from said adjustment member.

4. The apparatus as set forth in claim 3, wherein:
   said adjustment member and said shaft have therebetween means for frictionally engaging each other.

5. The apparatus as set forth in claim 4, wherein:
   said means for frictionally engaging comprises at least one O-ring.

6. The apparatus as set forth in claim 2, wherein:
   said biasing means comprises at least one spring between said outwardly projecting flange portion and said engagement portion.

7. The apparatus as set forth in claim 1, wherein:
   said contact means comprises a coil supporting element, a magnetic coil supported therein, and a frictional contact coating thereof; and said contact plate is an armature plate adapted to be attracted by said magnetic coil.

8. The apparatus as set forth in claim 7, wherein: said armature plate is concentric with said shaft.

9. The apparatus as set forth in claim 1, wherein:
   said contact plate has a torque transmitting annular member secured thereto, said annular member having a plurality of bolt holes therethrough;
   each said bolt assembly comprises a bolt and a threaded bolt sleeve received on said bolt, each said bolt and bolt sleeve receiving and holding said torque transmitting annular member therebetween at respective said bolt holes; and
   said radial flange has a plurality of axial bores therethrough corresponding to said bolt assemblies, each said bore having a bearing liner insert sleeve therein receiving a respective said bolt assembly.

10. The apparatus as set forth in claim 9, wherein said annular member is a spring member axially yieldable but substantially circumferentially rigid.

11. An apparatus for adjusting an air gap in at least one of a clutch and a brake mechanism, comprising:
- a rotatable shaft having a radial flange rotatably fixed therewith;
- an armature plate;
- means for mounting said armature plate to said radial flange such that said armature plate is axially movable in the axial direction of and relative to said shaft yet substantially rotationally rigid with respect to said shaft such that said armature plate rotates with said radial flange, said means for mounting comprising a plurality of bolt assemblies;
- a coil supporting element having an electromagnetic coil therein for attracting said armature plate;
- a contact element between said coil and said armature plate for contacting said armature plate when said coil attracts said armature plate;
- an engagement portion fixed to said armature plate and extending relative to said armature plate such that a space is formed between part of said engagement portion and said armature plate;
- means for biasing said armature plate away from said coil;
- an adjustment member frictionally engaged with said shaft and having a portion thereof disposed in said space so as to limit the range of movement of said armature plate by contacting said armature plate when said armature plate is biased away from said coil but allowing said engagement portion to move said adjustment member relative to said shaft when said armature plate is attracted toward said coil to compensate for wear between said contact element and said armature plate.

* * * * *